United States Patent
Kimoto et al.

[11] Patent Number: 5,325,357
[45] Date of Patent: Jun. 28, 1994

[54] PACKET BROADCASTING METHOD

[75] Inventors: Atsushi Kimoto, Hadano; Michio Suzuki, Odawara; Shoichiro Yamaguchi, Hiratsuka, all of Japan

[73] Assignees: Hitachi, Ltd., Tokyo; Hitachi Software Engineering Co., Ltd., Yokohama, both of Japan

[21] Appl. No.: 901,522

[22] Filed: Jun. 19, 1992

[30] Foreign Application Priority Data

Jul. 2, 1991 [JP] Japan .................. 3-186932

[51] Int. Cl.5 .......................... H04Q 11/04
[52] U.S. Cl. ...................... 370/60; 370/94.1
[58] Field of Search .......... 370/60, 60.1, 61, 58.3, 370/85.3, 94.1; 379/96

[56] References Cited
U.S. PATENT DOCUMENTS 5,138,613 8/1992 Kudoh .................. 370/94.1
5,140,585 8/1992 Tomikawa ............. 370/60.1
5,216,427 6/1993 Yan et al. .............. 370/60

FOREIGN PATENT DOCUMENTS 61-140251 6/1986 Japan .

Primary Examiner—Douglas W. Olms
Assistant Examiner—Shick Hom
Attorney, Agent, or Firm—Kenyon & Kenyon

[57] ABSTRACT

A packet broadcasting method broadcasts a data packet sent by a broadcasting source terminal to a number of broadcast destination terminals. A broadcasting apparatus having a peculiar DTE address is provided in a packet switching system and a broadcasting table having one or a plurality of broadcasting source terminals is defined in the broadcasting apparatus. The broadcasting apparatus registers a terminal other than a broadcasting source terminal into the broadcasting table as a broadcast destination terminal in response to a call set-up from such a terminal When the broadcasting apparatus receives a data packet from the broadcasting source terminal, a data packet having the same data as the received data packet is sent to the broadcast destination terminal.

17 Claims, 15 Drawing Sheets

PACKET BROADCASTING METHOD

BACKGROUND OF THE INVENTION

The present invention relates to a packet broadcasting method, and more particularly, to a packet broadcasting method for group broadcasting a data packet transmitted by a broadcasting source terminal to a plurality of broadcast destination terminals.

A technique for broadcast communication or the broadcasting operation in a packet switching system, is described in JP-A-61-140251 is known.

In the prior art, a broadcasting table in which called terminals or destination terminals are defined for each calling terminal or source terminal is provided in a packet switching office, and the packet switching office performs the broadcasting operation on the basis of the broadcasting contents of the table.

In the prior art, since the broadcasting or the broadcast communication is performed in the packet switching office including the broadcasting function, it is necessary to add the broadcasting function in an existing packet switching network when the existing packet switching network is to realize the broadcasting. Accordingly, there is a problem that it is difficult to attain the broadcasting operation in the existing packet switching network. Further, there is a problem that a large amount of pre-defined data is required since destination terminals are required to be pre-defined for each source terminal effecting the broadcasting operation.

Furthermore, in the prior art, when a broadcast destination terminal is added or changed, it is necessary to change the pre-defined data stored in the packet switching office and accordingly flexibility is lacking in such a system. The broadcasting table is pre-defined for each source terminal effecting the broadcasting operation, while since the table has no table identification, only one group of destination terminals is pre-defined for each source terminal. Accordingly, there is a problem that it is impossible to select broadcast destination terminals depending on the contents of data to be broadcast.

In addition, in the prior art, when a data packet is transmitted to destination terminals, a packet switching office which has received the data packet from a source terminal directly transmits the data packet to all of the destination terminals individually. Accordingly, when the destination terminals are increased, there is a problem that a time required to perform the whole broadcasting operation in the packet switching office is lengthened to thereby enlarge differences in reception times of the data packet among the destination terminals and increase trunk traffic in the packet switching network which adversely affects other communication.

SUMMARY OF THE INVENTION

To eliminate the aforementioned problems of the prior art, the present invention provides a packet broadcasting system capable of being attained in an existing packet switching network with high flexibility and expandability and performing the broadcasting operation in a short time without increased trunk traffic in the packet switching network.

According to the present invention, the above object is attained by providing in a packet switching system a broadcasting apparatus to which a DTE address is assigned and performing the packet broadcasting process by means of the broadcasting apparatus. Further, the object is attained by providing in the packet switching system a broadcasting apparatus as a terminal on a protocol to cause each of destination terminals to set up a call to the broadcasting apparatus to allow each of terminals to inform that each of terminals is a broadcast destination terminal (hereinafter referred to as a sink terminal) and performing the broadcasting operation by means of the broadcasting apparatus on the basis of that information.

More particularly, the object is attained by registering a terminal other than source terminals of broadcast data as a sink terminal automatically when the broadcasting apparatus receives an incoming call from the other terminal defined as the sink terminal and defining a plurality of broadcasting tables in accordance with a plurality of DTE (terminal) addresses assigned to the broadcasting apparatus. Preferably, data packet is continuously transmitted to the sink terminals by repeatedly using a plurality of finite transmission buffers in which the contents of the data packet are copied. Further, a plurality of broadcasting apparatuses are dispersedly provided in the packet switching system if desired so that transmission of the data packet to the sink terminals is effected to be distributed among the plurality of broadcasting apparatuses.

The broadcasting apparatus may be externally connected to the packet switching office or the broadcasting apparatus may be realized as an internal function of the packet switching office.

The source terminal transmits a data packet to the broadcasting apparatus provided in the packet switching system. The broadcasting apparatus which has received the data packet from the source terminal copies the data packet and transmits the data packet to all of the sink terminals which are registered in the broadcasting table, so that the data packet transmitted by the source terminal can be broadcast through the packet switching network to a number of sink terminals simultaneously.

Registering of sink terminals into the broadcasting table in the broadcasting apparatus is made such that, when a call set-up is requested to the broadcasting apparatus from a terminal which is not registered as the source terminal, the terminal is automatically registered as a sink terminal. Thus, the broadcasting system with high flexibility and expandability can be attained.

Further, by registering a plurality of source terminals into the broadcasting table, the data packet from the plurality of source terminals can be broadcast to the same group of sink terminals. In addition, by defining a plurality of broadcasting tables corresponding to a plurality of DTE addresses of the broadcasting apparatus, the group broadcasting can be multiplexed by selecting the DTE addresses of the broadcasting apparatus when the source terminal transmits the data packet.

By limiting the number of the transmission buffers in which the contents of the data packet are copied to a number smaller than the number of the sink terminals, for example seven, when the data packet is copied to be transmitted to the sink terminals, the copying time can be shortened and continuous transmission of the data can be effected by repeatedly using the transmission buffers when the data packet is transmitted to each of the sink terminals. Accordingly, the efficiency of utilization of line upon transmission of the data packet can be enhanced and the broadcasting operation can be performed in a short time.

Further, by providing a plurality of broadcasting apparatuses in the packet switching system dispersedly and structuring the broadcasting apparatuses into a hierarchical configuration if desired, transmission of the data packet to the sink terminals can be processed among the broadcasting apparatuses dispersedly and the broadcasting operation can be performed for a large number of sink terminals in a short time without increased trunk traffic in the packet switching network.

DETAILED DESCRIPTION OF THE PREFERRED EMBODIMENTS

An embodiment of a packet broadcasting system according to the present invention is now described in detail with reference to the accompanying drawings.

Figure 1:
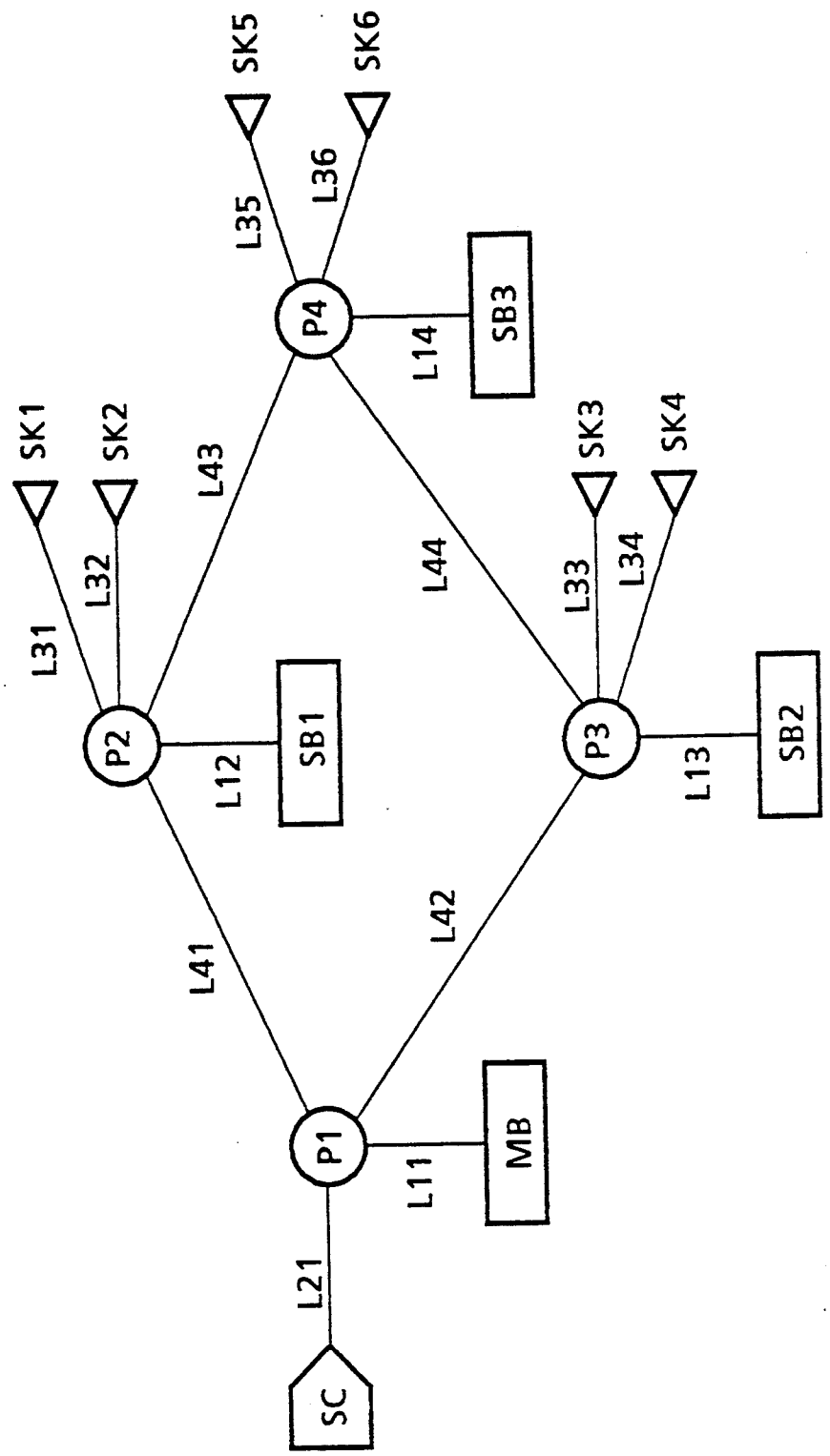
FIG. 1 is a block diagram schematically illustrating a system configuration of an embodiment of a packet broadcasting system to which the present invention is applied.

FIG. 1 is a block diagram schematically illustrating a system configuration of an embodiment of the packet broadcasting system to which the present invention is applied. In FIG. 1, P1 to P4 represent packet switching offices, MB a master broadcasting apparatus, SB1 to SB3 slave broadcasting apparatuses, SC a source terminal, and SK1 to SK6 sink terminals. The illustrated embodiment of the present invention includes a hierarchical structure constituted of a plurality of broadcasting apparatuses.

In the system shown in FIG. 1, the master broadcasting apparatus MB and the slave broadcasting apparatuses SB1 to SB3 are connected to the packet switching offices P1 to P4 through lines L11 to L14, respectively. The source terminal SC and the sink terminals SK1 to SK6 are connected to the packet switching offices P1 to P4 through subscriber lines L21 and L31 to L36, respectively. Further, the packet switching offices P1 to P4 are connected to each other through trunk lines L41 to L44.

In the illustrated embodiment of the present invention, the source terminal SC is previously defined in a broadcasting table provided in the master broadcasting apparatus MB. When the master broadcasting apparatus MB receives an incoming call from the slave broadcasting apparatus SB1-SB3 or the sink terminal (for example, when an operator instructs a call set-up), the master broadcasting apparatus MB registers the slave broadcasting apparatus or the sink terminal in the broadcasting table as a sink terminal. The master broadcasting apparatus MB is defined in each of the slave broadcasting apparatuses SB1 to SB3 as a source terminal. The sink terminals SK1 to SK6 send a call request packet to the corresponding slave broadcasting apparatuses SB1 to SB3 of the packet switching offices P2 to P4 connected to the sink terminals SK1 to SK6, respectively, and inform the corresponding slave broadcasting apparatuses that each of the terminals SK1 to SK6 is a sink terminal. Thus, the slave broadcasting apparatuses SB1 to SB4 register the sink terminals SK1 to SK6 in the broadcasting table.

Figure 2:
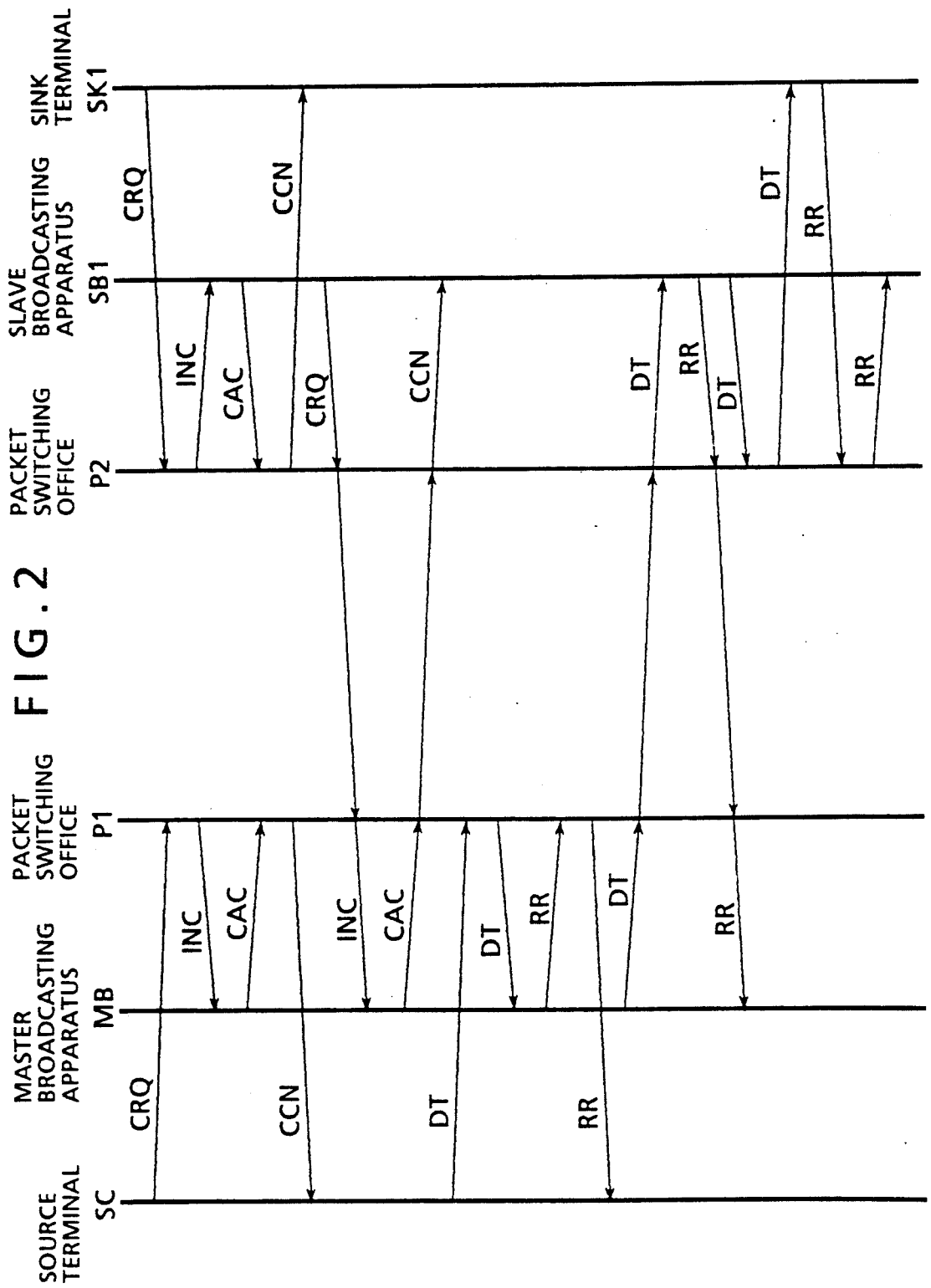
FIG. 2 schematically illustrates a call set-up and transmission of a data packet in the embodiment of FIG. 1.

FIG. 2 schematically illustrates a call set-up and transmission of a data packet in the embodiment of the present invention structured above.

In FIG. 2, the sink terminal SK1 sends a call request (CRQ) packet to the packet switching office P2 to request a call set-up to the slave broadcasting apparatus SB1. The packet switching office P2 sends an incoming call (INC) packet to the slave broadcasting apparatus SB1 and receives a call accepted (CAC) packet from the slave broadcasting apparatus SB1 to thereby send a call connected (CCN) packet to the sink terminal SK1. In this operation, the slave broadcasting apparatus SB1 stores the sink terminal SKI in the broadcasting table.

The slave broadcasting apparatus SB1 then sends a CRQ packet to the packet switching office P2 to request a call to the master broadcasting apparatus MB. The CRQ packet is sent to the packet switching office P1. The packet switching office P1 sends an INC packet to the master broadcasting apparatus MB and receives a CAC packet from the master broadcasting apparatus MB. The packet switching office P1 also sends a CCN packet to the slave broadcasting apparatus SB1 via packet switching office P2. Thus, the master broadcasting apparatus MB registers the slave broadcasting apparatus SB1 as a sink terminal in the broadcasting table provided therein.

When the source terminal SC is to broadcast a data (DT) packet, the source terminal SC sends a CRQ packet to the master broadcasting apparatus MB in the same procedure that the sink terminal SK1 sends the CRQ packet to the slave broadcasting apparatus SB1. That is, the source terminal SC sends a call request (CRQ) packet to the packet switching office P1 to request a call set-up to the master broadcasting apparatus MB. The packet switching office P1 sends an incoming call (INC) packet to the master broadcasting apparatus MB and receives a call accepted (CAC) packet from the master broadcasting apparatus MB to thereby send a call connected (CCN) packet to the source terminal SC. After the source terminal receives a CCN packet from the master broadcasting apparatus MB, via the packet switching office P1, the source terminal SC sends the DT packet to the master broadcasting apparatus MB via packet switching office P1. When the master broadcasting apparatus MB receives the DT packet, the master broadcasting apparatus MB sends a receive ready (RR) packet to the source terminal SC through the packet switching office P1.

Thereafter, the master broadcasting apparatus MB uses the broadcasting table to start the broadcast communication. In this example, since the slave broadcasting apparatus SB1 is registered in the broadcasting table, the master broadcasting apparatus MB sends the DT packet to the slave broadcasting apparatus SB1 through the packet switching offices P1 and P2 by referencing its own broadcasting table and receives the RR packet. The slave broadcasting apparatus SB1 sends the received DT packet to the sink terminal SK1 through the packet switching office P2 with reference to the broadcasting table provided in the slave broadcasting apparatus SB1.

In the embodiment of the present invention, as described above, since the broadcasting apparatus can automatically register as a sink terminal the source terminal sending a call request packet where the source terminal and the sink terminals need not be particularly defined as part of the system definition data, the sink terminal can be registered and added easily. Further, since the master broadcasting apparatus treats the slave broadcasting apparatus as a sink terminal and the slave broadcasting apparatus treats the master broadcasting apparatus as a source terminal, a slave broadcasting apparatus can be registered and added easily.

According to the embodiment of the present invention, the broadcasting system with high flexibility and expandability can be attained.

The foregoing description has been made to the case where one slave broadcasting apparatus and one sink terminal are provided, while the master broadcasting apparatus can send the data packet to a plurality of slave broadcasting apparatuses registered in the broadcasting table as the sink terminals and the slave broadcasting apparatus can send the data packet to a plurality of all sink terminals registered in the broadcasting table provided in the slave broadcasting apparatus.

Further, in FIG. 1, the sink terminals connected to the packet switching offices P2-P3 send a call request packet to the slave broadcasting apparatus connected to the packet switching office to which the sink terminals are accommodated or connected and are registered as sink terminals. Accordingly, the master broadcasting apparatus MB is merely required to send data packets to only the slave broadcasting apparatuses. Hence, the trunk traffic of the packet switching network can be only slight traffic between the master broadcasting apparatus MB and the slave broadcasting apparatus SB1. Thus, in the embodiment of the present invention, the broadcasting operation for a large number of sink terminals can be realized without increased trunk traffic of the packet switching network.

Figure 3:
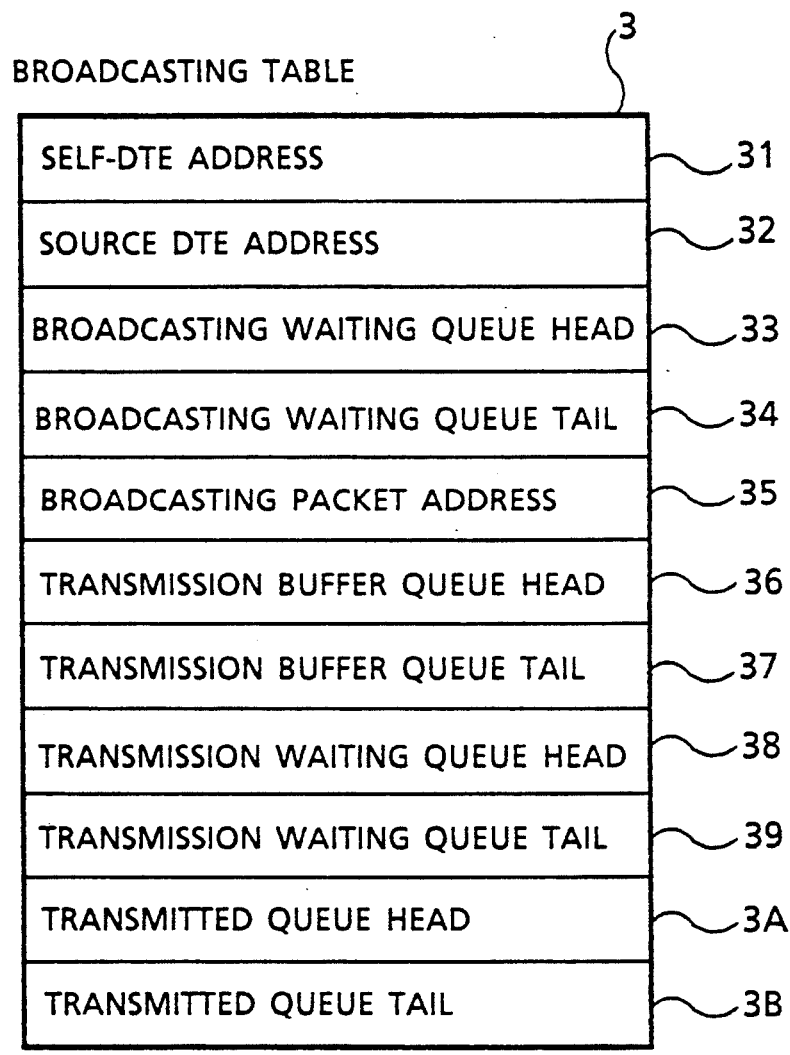
FIG. 3 shows a structure of a broadcasting table defined in broadcasting apparatuses.

FIG. 3 shows a structure of a broadcasting table 3 defined in the broadcasting apparatuses. When a plurality of DTE addresses are assigned to the broadcasting apparatus, combinations of a source terminal and a sink terminal, that is, the group broadcasting operation can be multiplexed by defining a plurality of broadcasting tables in accordance with the DTE addresses. System configuration definition data in the broadcasting table 3 are a self-DTE address 31 for the broadcasting apparatus itself and a source DTE address 32 and other data areas are used as work areas.

In FIG. 3, the self-DTE address 31 represents the DTE address of the broadcasting apparatus itself. When a multiplicity of broadcasting tables 3 are defined, a different self-DTE address is defined for each table. The source DTE address 32 represents the DTE address of the source terminal, while since the master broadcasting apparatus is regarded as the source terminal in the case of the slave broadcasting apparatus, the DTE address of the master broadcasting apparatus is defined for the source DTE address. A plurality of source DTE addresses 32 can be defined for the source DTE address 32 and accordingly the data packet received from the plurality of source terminals can be broadcast to the same group of sink terminals.

A broadcasting waiting queue head 33 and a broadcasting waiting queue tail 34 are work areas for saving a new data packet received from the source terminal during transmission of the data packet to the sink terminal in the chain manner. A broadcasting packet address 35 is an address for a work area for saving an address of the data packet being transmitted to the sink terminal.

A transmission buffer queue head 36 and a transmission buffer queue tail 37 are areas for saving transmission buffers for transmitting the data packet to the sink terminal in the chain manner. In the initial state, seven transmission buffers are saved therein. The reason the seven transmission buffers are provided is that the maximum number of outstanding transmissions of HDLC (High Level Data Link Control procedure) is seven and the transmission buffers having an affirmative response at the HDLC level can be successively diverted for transmission to the sink terminal to which transmission has been not yet made so that the efficiency of utilization of lines for transmission of the data packet can be increased and the processing time of the whole broadcasting process can be shortened only by copying process to the minimum transmission buffers.

A transmission waiting queue head 38 and a transmission waiting queue tail 39 are work areas for saving a channel control table 4 (to be described in detail later) of a logic channel for the sink terminal to which transmission has been not yet made in the chain manner. The channel control table 4 of the logic channel connected between the broadcasting apparatus and the sink terminal is first saved in this queue. Further, a transmitted queue head 3A and a transmitted queue tail 3B are work areas for saving the channel control table 4 of the logic channel for the sink terminal to which transmission has been not yet made in the chain manner.

Figure 4:
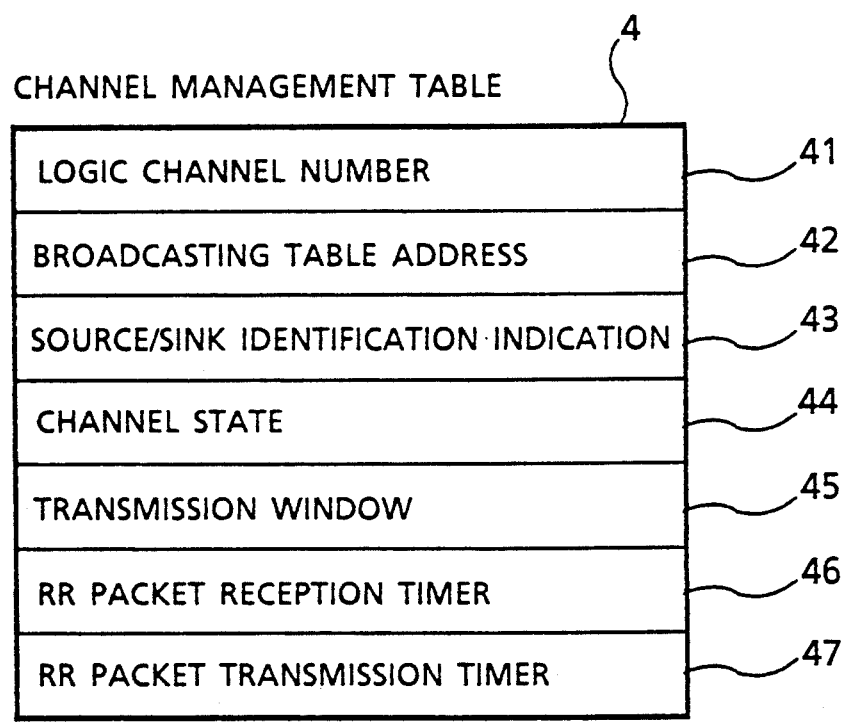
FIG. 4 shows a structure of a channel control table for controlling states of a logic channel.

FIG. 4 shows a structure of a channel control table 4 for controlling states of the logic channel. The channel control table 4 is provided for each logic channel number.

In FIG. 4, a logic channel number 41 is definition data of the logic channel number and a broadcasting table address 42 is a work area for saving a broadcasting table address of the broadcasting group to which the logic channel corresponds. Further, a source/sink identification indication 43 is a work area for identifying whether the logic channel communicates with a source terminal or a sink terminal and is set upon a call set-up. A channel state 44 is a work area for saving a state of the logic channel and indicates a transmittable state of the data packet, a reception waiting state of the RR packet or a reset state.

A transmission window 45 is a work area for saving a window capable of transmitting the data packet with this logic channel. When the transmission window is full, it indicates that the subsequent data packet can not be transmitted. Further, an RR packet reception timer 46 is a work area for monitoring reception of the RR packet when the transmission window is full, and an RR packet transmission timer 47 is a work area for monitoring a transmission timing of the RR packet to the source terminal when the number of data packets in the broadcasting waiting state exceeds a predetermined value.

Operation of the embodiment of the present invention is now described in detail with reference to the flowcharts of FIGS. 5 to 15 illustrating procedures relative to transmission and reception of packet in the broadcasting apparatus.

Figure 5:
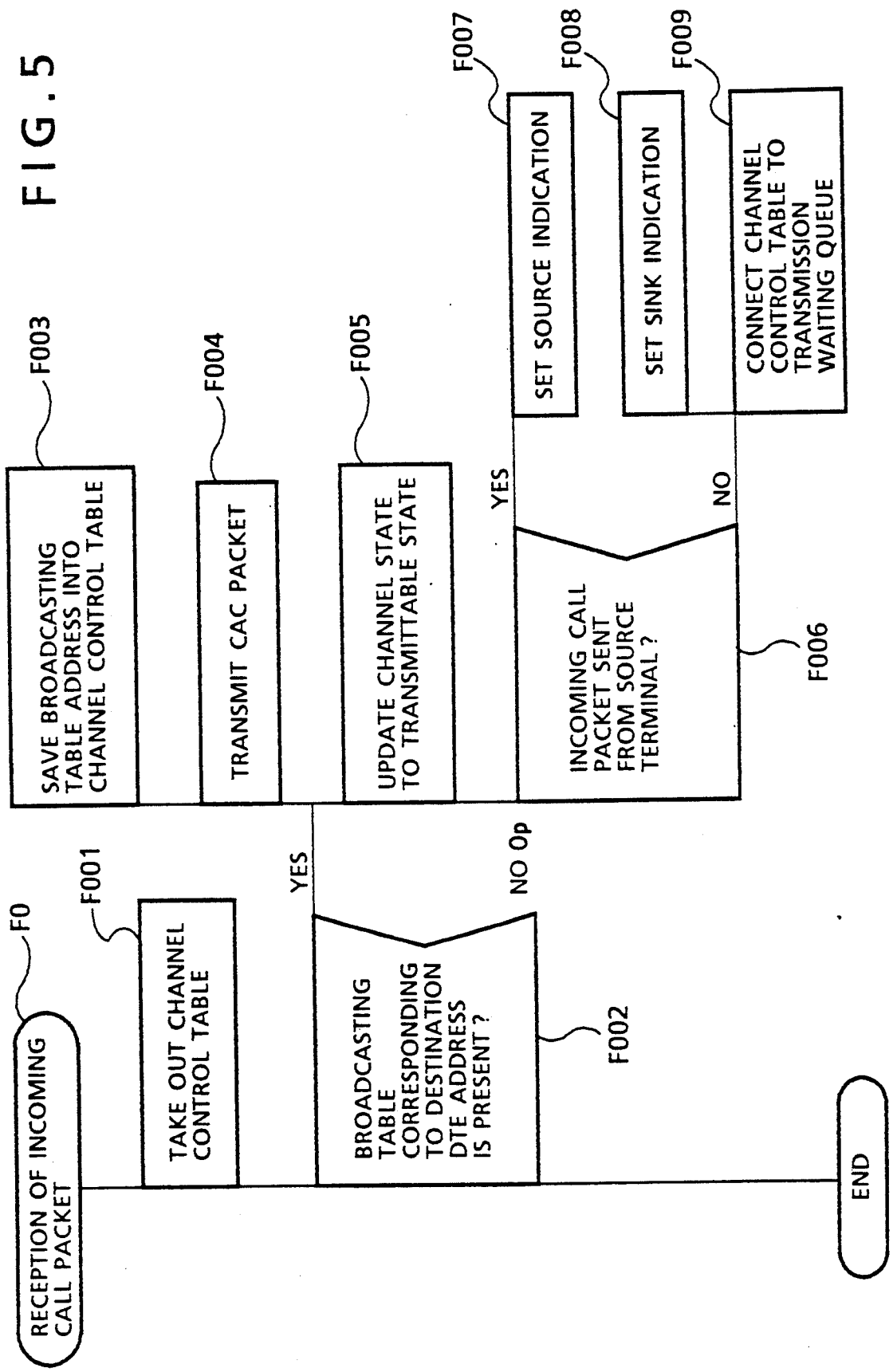
FIG. 5 is a flowchart illustrating a process upon reception of an incoming call packet.
Figure 6:
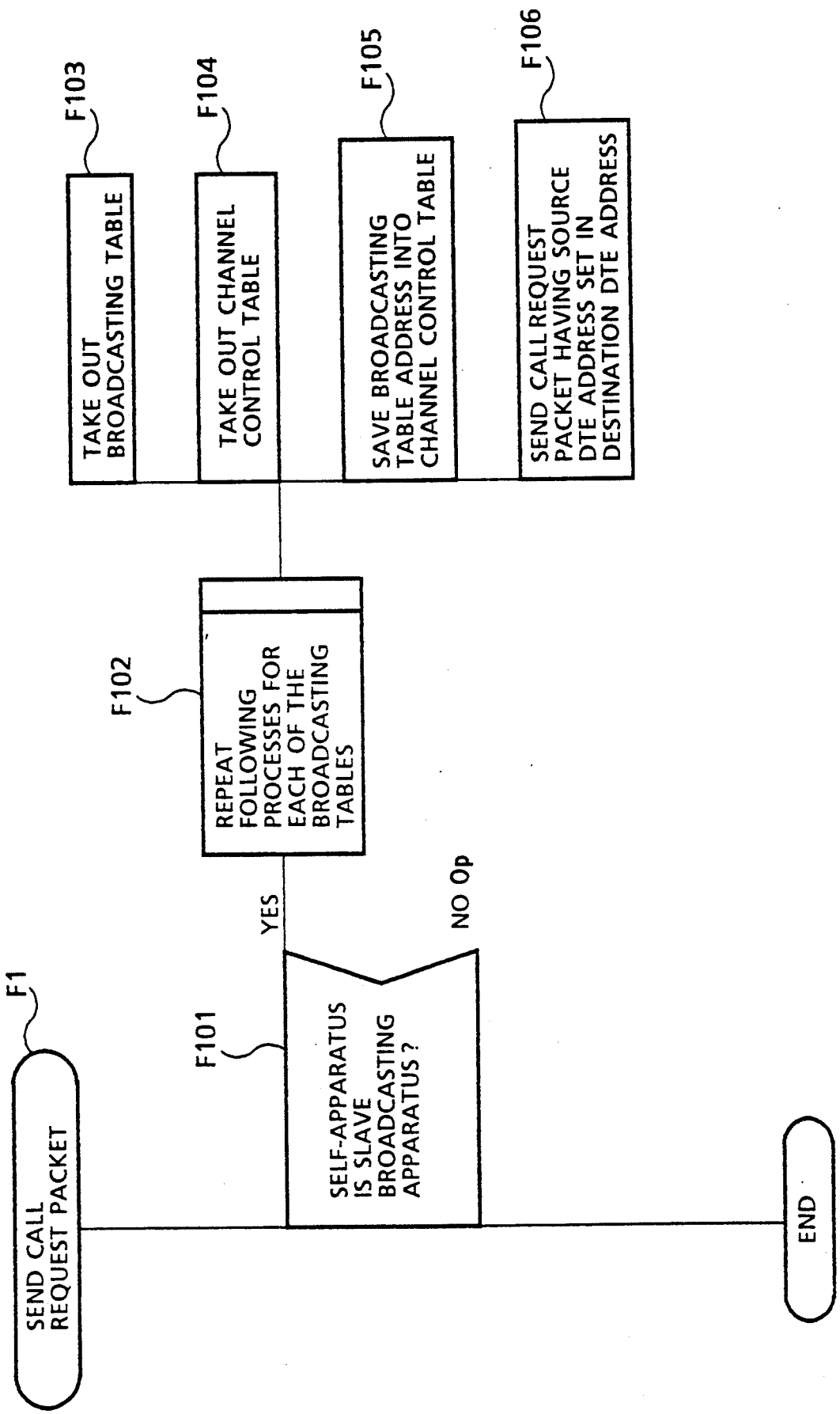
FIG. 6 is a flowchart illustrating a process upon transmission of a call request packet.
Figure 7:
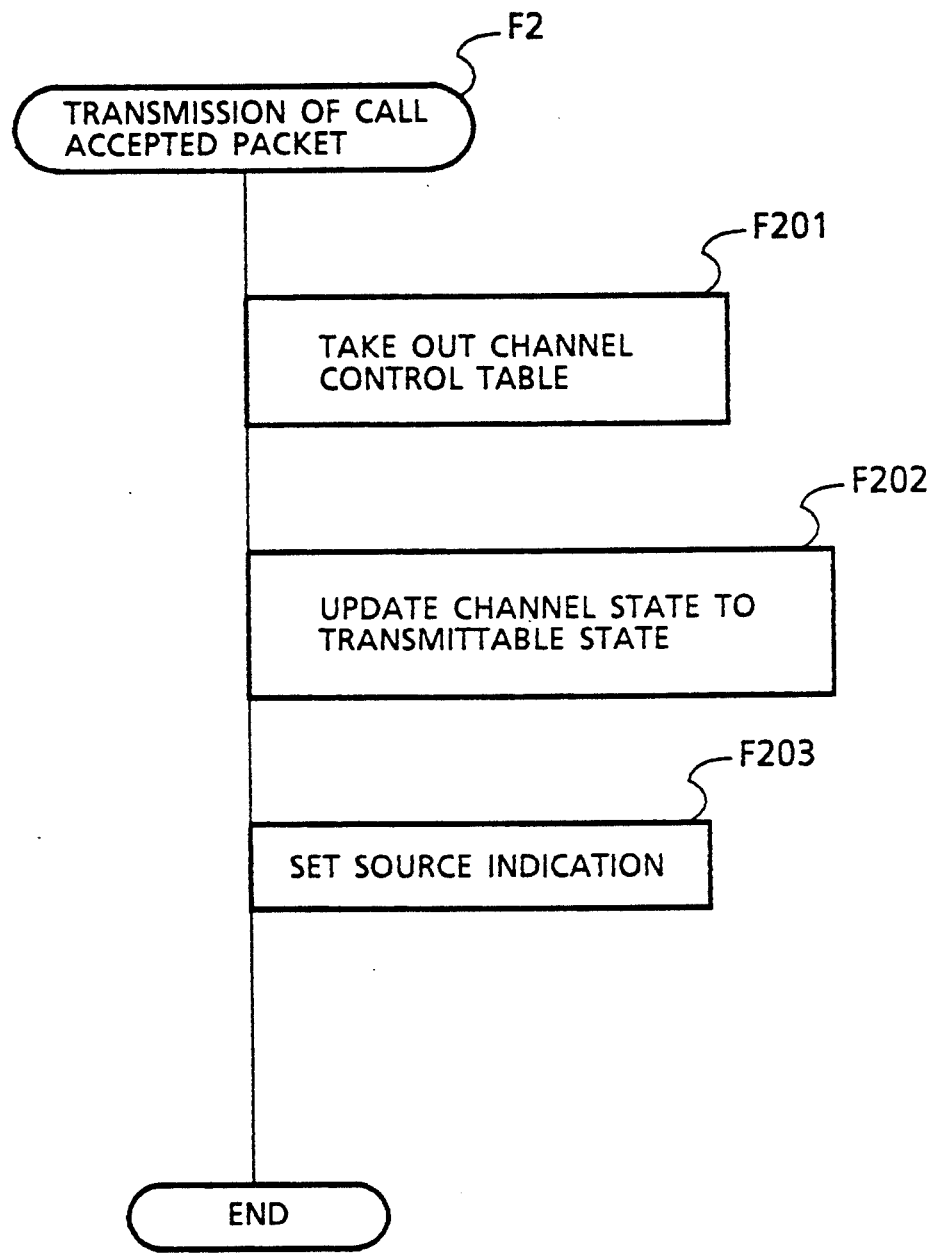
FIG. 7 is a flowchart illustrating a process upon reception of an incoming response packet.
Figure 8:
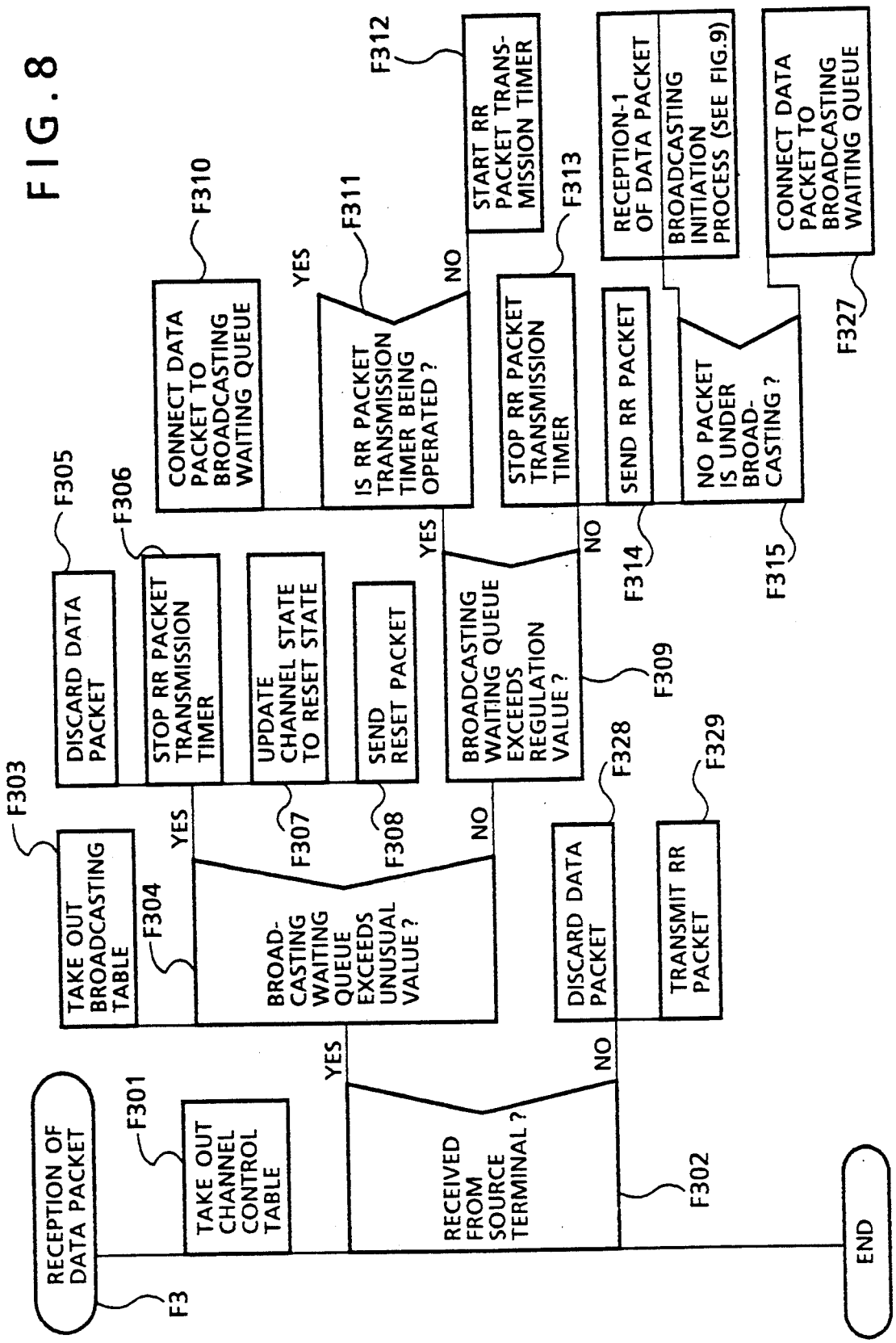
FIG. 8 is a flowchart illustrating a process upon reception of data packet.
Figure 9:
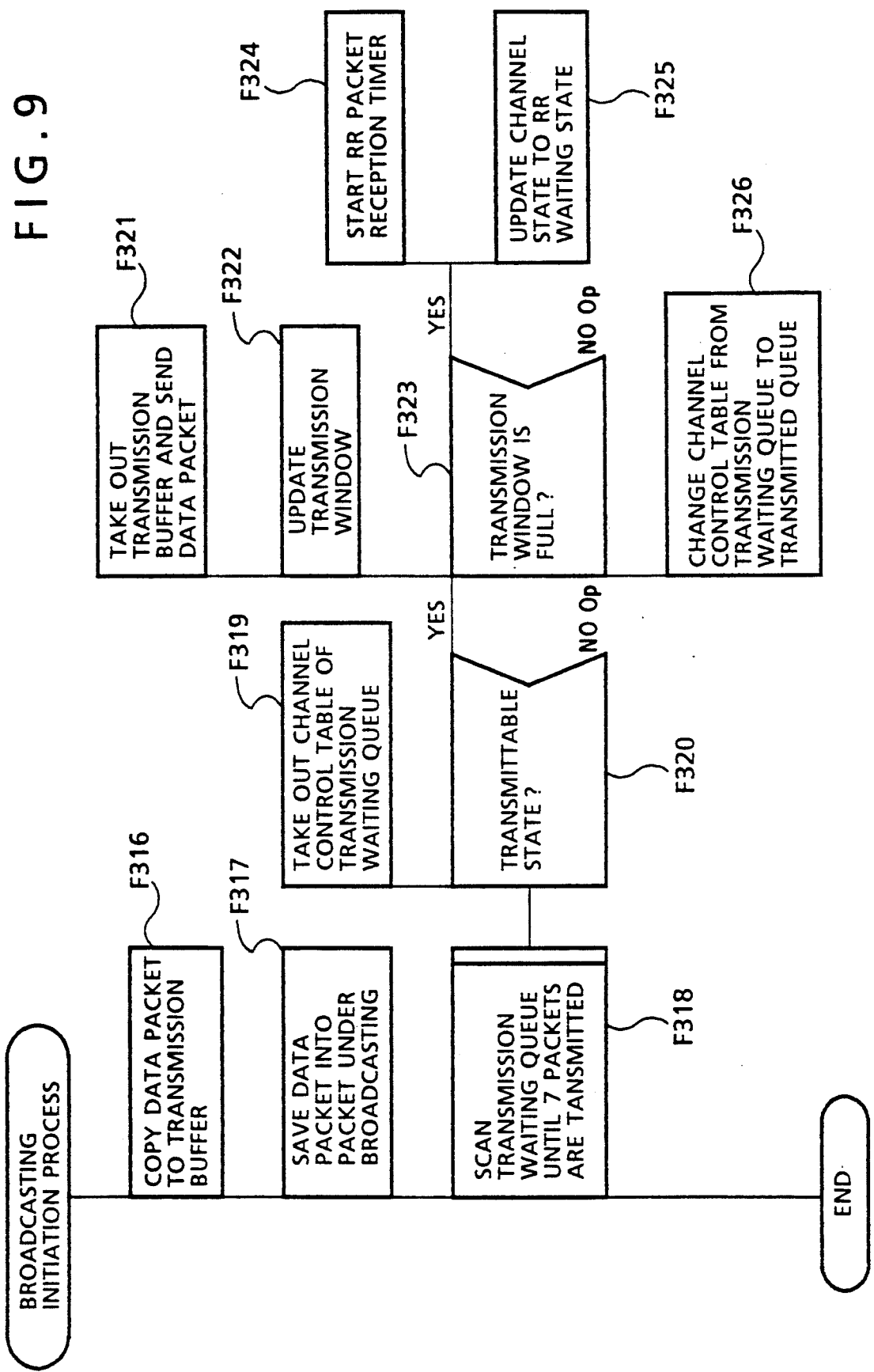
FIG. 9 is a flowchart illustrating a broadcasting start process upon reception of data packet.
Figure 10:
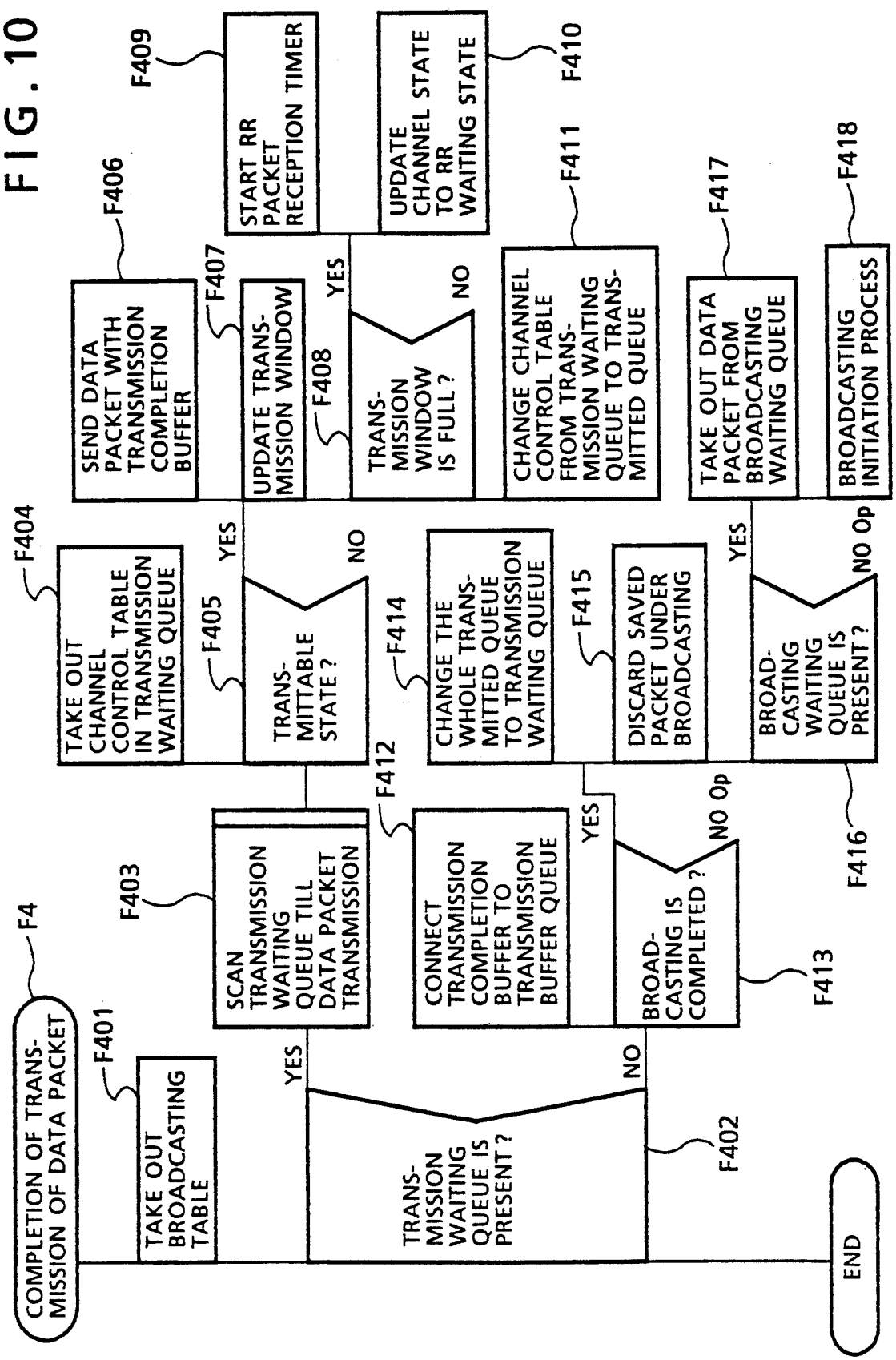
FIG. 10 is a flowchart illustrating a process upon termination of transmission of data packet.
Figure 11:
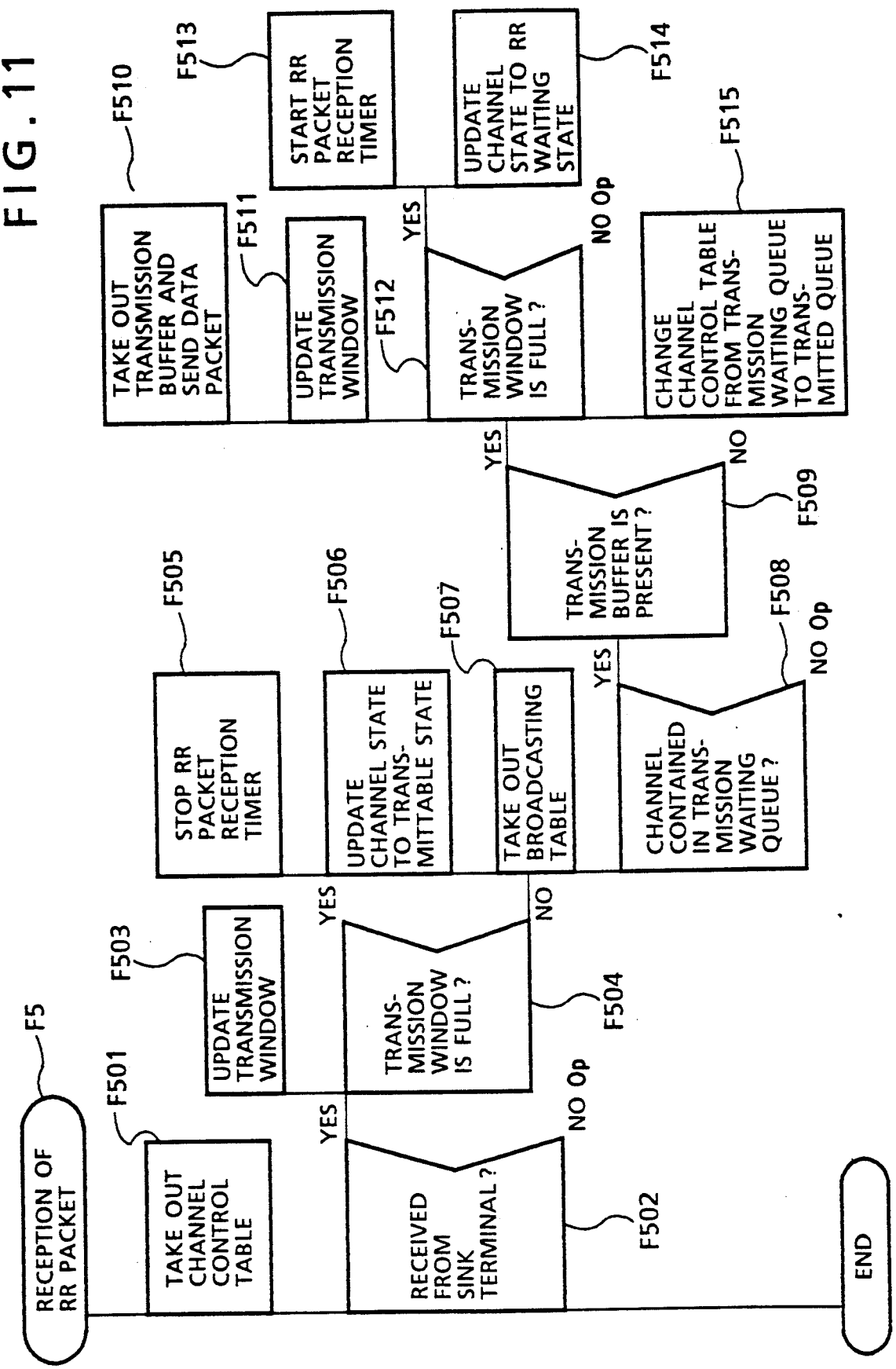
FIG. 11 is a flowchart illustrating a process upon reception of RR packet.
Figure 12:
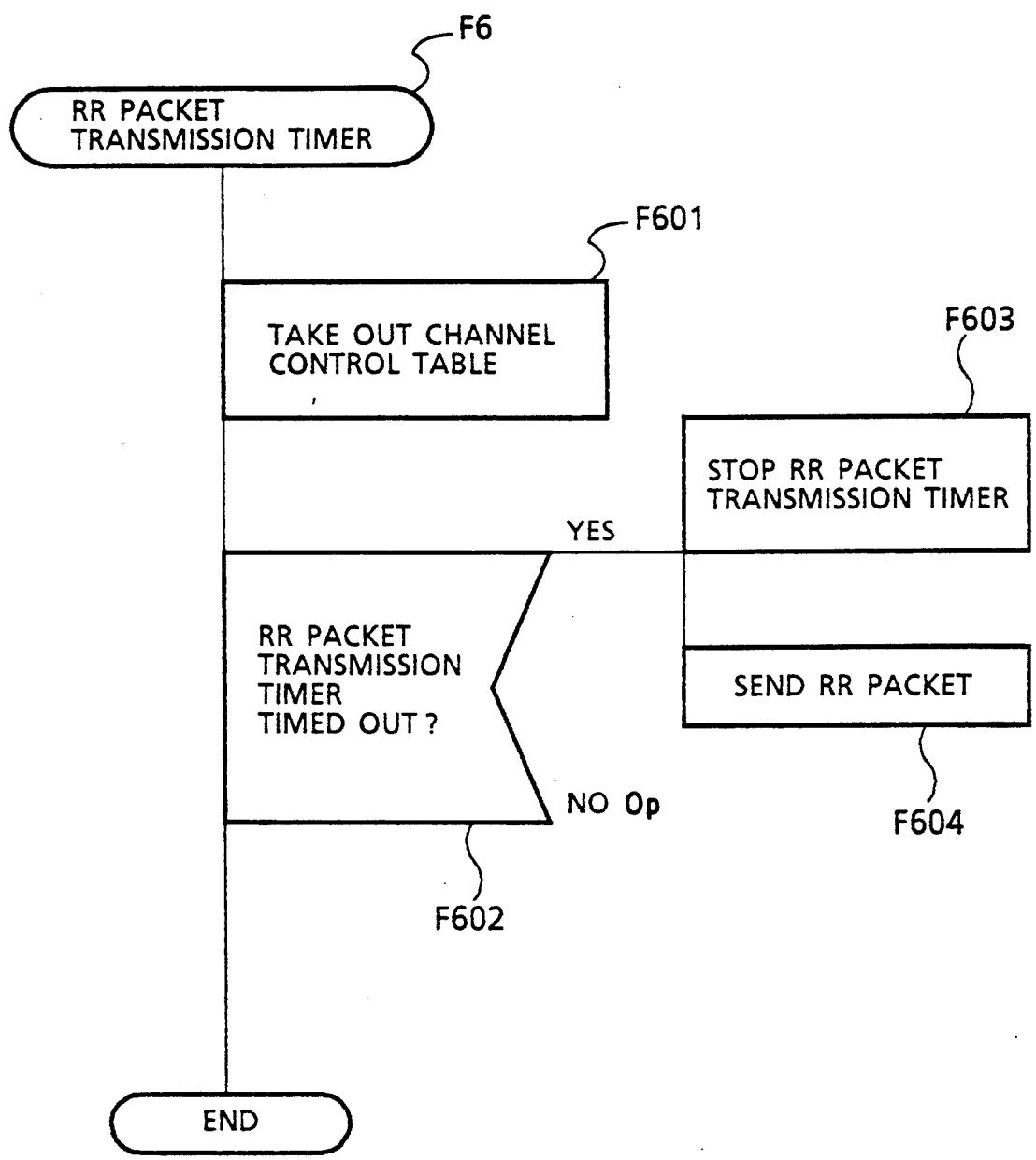
FIG. 12 is a flowchart illustrating a process of a transmission timer of the RR packet.
Figure 13:
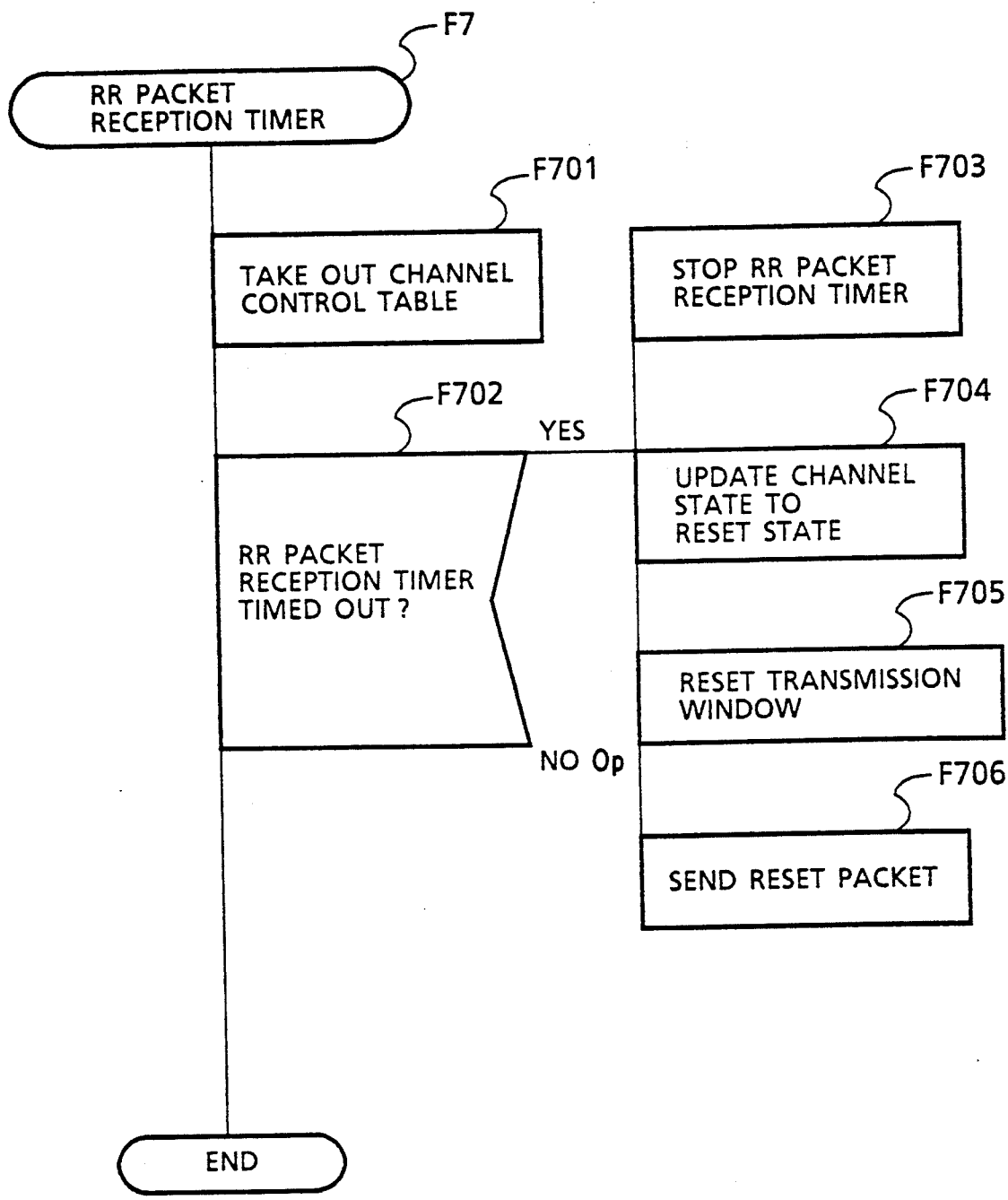
FIG. 13 is a flowchart illustrating a process of a reception timer of the RR packet.
Figure 14:
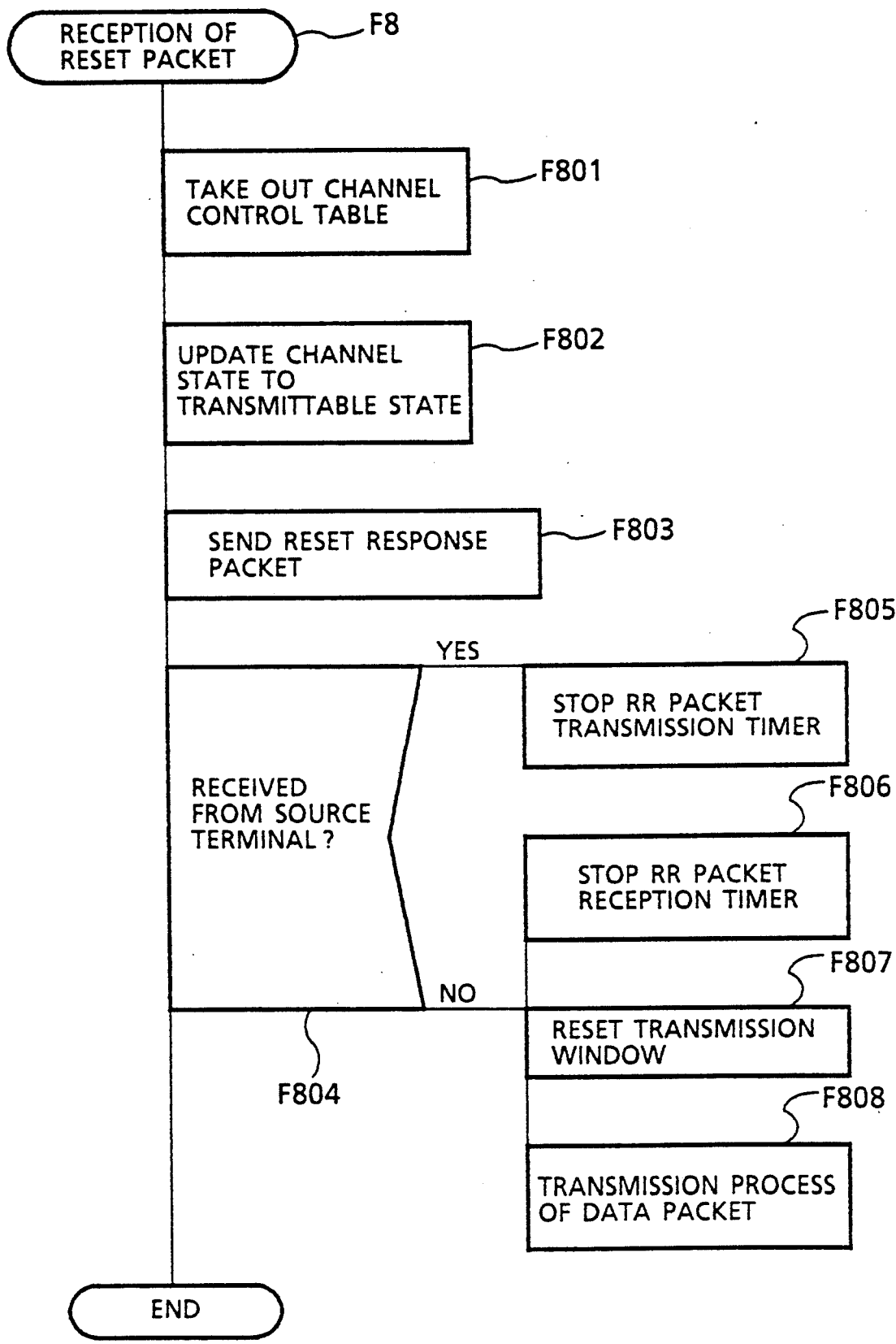
FIG. 14 is a flowchart illustrating a process upon reception of reset packet.
Figure 15:
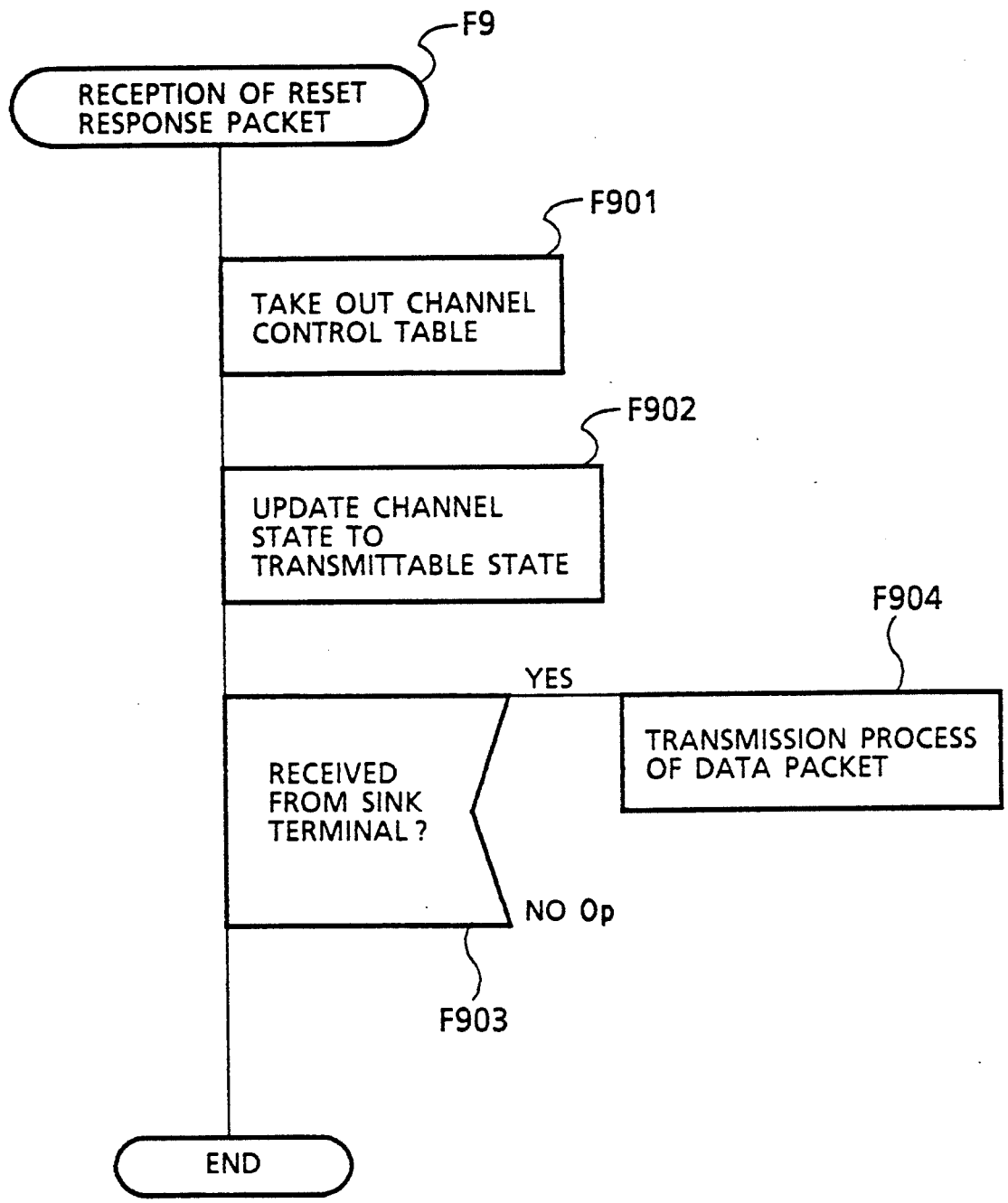
FIG. 15 is a flowchart illustrating a process upon reception of reset response packet.

FIG. 5 is a flowchart illustrating a process upon reception of an incoming call packet, FIG. 6 a flowchart illustrating a process upon transmission of a call request packet, FIG. 7 a flowchart illustrating a process upon reception of an incoming response packet, FIG. 8 a flowchart illustrating a process upon reception of data packet, FIG. 9 a flowchart illustrating a broadcasting start process upon reception of data packet, FIG. 10 a flowchart illustrating a process upon termination of transmission of data packet, FIG. 11 a flowchart illustrating a process upon reception of RR packet, FIG. 12 a flowchart illustrating a process of a transmission timer of the RR packet, FIG. 13 a flowchart illustrating a process of a reception timer of the RR packet, FIG. 14 a flowchart illustrating a process upon reception of reset packet, and FIG. 15 a flowchart illustrating a process upon reception of reset response packet.

Referring now to FIG. 5, a process F0 upon reception of an incoming call packet will be explained.

(1) When the broadcasting apparatus receives an incoming call packet, the channel control table 4 of the logic channel number 41 corresponding to the logic channel number in the incoming call packet is taken out (step F001).

(2) Whether a self-DTE address 31 in the broadcasting table 3 is coincident with the destination DTE address in the incoming call packet or not is examined. If coincident, the address of the broadcasting table 3 is saved in the broadcasting table address 42 of the channel control table 4. The broadcasting apparatus sends the call accepted (CAC) packet and updates the channel state 44 of the channel control table 4 to a transmittable state (steps F002-F005).

(3) When a source DTE address 32 of the broadcasting table 3 has an address coincident with the source DTE address in the incoming call packet, the incoming call packet is a packet sent from the source terminal and accordingly a source indication is set in the source/sink identification indication 43 of the channel control table 4. Otherwise, the incoming call packet is regarded as an incoming call packet sent from the sink terminal and the sink indication is set. The channel control table 4 is connected to the transmission waiting queue with reference to the transmission waiting queue head 38 and the transmission waiting queue tail 39 of the broadcasting table 3 (steps F006-F009).

Referring now to FIG. 6. a process F1 upon transmission of the call request packet is described.

(1) Whether the self-apparatus is the slave broadcasting apparatus or not is examined. When the self-apparatus is the slave broadcasting apparatus, the call originating process to be described hereinafter is made for each of the broadcasting tables 3 (steps F101, F102).

(2) The broadcasting table 3 and the channel control table 4 not used are taken out and the address of the broadcasting table 3 is saved in the broadcasting table address 42 of the channel control table 4. The call request (CRQ) packet in which the source DTE address 32 of the broadcasting table 3 is set as the destination DTE address is sent to the source terminal (actually the master broadcasting apparatus) (steps F103-F106).

Referring now to FIG. 7, a process F2 in the case where the slave broadcasting apparatus receives the call accepted packet or the call response packet after transmission of the call request packet is described.

(1) When the slave broadcasting apparatus receives a call accepted packet, the channel control table 4 of the logic channel number 41 corresponding to the logic channel number in the call accepted packet is taken out (step F201).

(2) The channel state 44 of the table 4 is updated to the transmittable state and the source indication is set in the source/sink identification indication 43 (steps F202, F203).

Referring now to FIGS. 8 and 9, the data packet reception process and the broadcasting initiation process F3 performed upon reception of the data packet is described.

(1) When the broadcasting apparatus receives the data packet, the channel control table 4 of the logic channel number 41 corresponding to the logic channel number in the data packet is taken out (step F301).

(2) Whether the received data packet is sent from the source terminal or the sink terminal is examined by reference to the source/sink identification indication 43 of the channel control table 4. When it is the sink indication, the received data packet is discarded and the RR packet is sent as an affirmative response (steps F302, F328, F329).

(3) When the decision in the step F302 is the source indication, the broadcasting table 3 is taken out by reference to the broadcasting table address 42 of the channel control table 4 (step F303).

(4) An unusual process, a regulated process or a normal process is carried out depending on the number of data packets in the broadcasting waiting queue while referring to the broadcasting waiting queue head 33 and the broadcasting waiting queue tail 34 of the broadcasting table 3 (steps F304, F309).

(5) When the number of data packets in the broadcasting waiting queue exceeds an unusual value in the decision of the step F304, the received data packet is discarded and the RR packet transmission timer 47 of the channel control table 4 is stopped. The channel state 44 is updated to the reset state and the reset packet is sent (steps F305-F308).

(6) When the number of data packets in the broadcasting waiting queue does not exceed the unusual value but exceeds the regulation value in the decision of steps F304 and F309, the received data packet is connected to the broadcasting waiting queue, and if the RR packet transmission timer 47 of the channel control table 4 is not operated, the RR packet transmission timer 47 is started (step F310-F312).

(7) When the number of data packet in the broadcasting waiting queue is within the regulation value in the decision of step F309, the RR packet transmission timer 47 of the channel control table 4 is stopped and the RR packet is sent as an affirmative response (steps F313, F314).

(8) Whether a packet under broadcasting is present or not is examined by reference to the broadcasting packet address 35 of the broadcasting control table 3. When a packet under broadcasting is present, the received data packet is connected to the broadcasting queue of the broadcasting control table 3 (steps F315, F327).

(9) When no packet is under broadcasting, the contents of the received data packet are copied to seven transmission buffers chained to the transmission buffer queue head 36 and the transmission buffer queue tail 37 of the broadcasting table 3 as the broadcasting initiation process and the received data packet is saved in the broadcasting packet address 35 (steps F316, F317).

(10) Then, the channel control table 4 chained to the transmission waiting queue head 38 and to the transmission waiting queue tail 39 is scanned. Thus, seven channel control tables 4 having the channel state 4 being in the transmittable state are selected from its head and the data packet in the transmission buffer is sent (steps F318-F321).

(11) The transmission window 45 of the channel control table 4 with the data packet transmitted is updated and is disconnected from the transmission waiting queue to be connected to the transmitted queue chained to the transmitted queue head 3A and the transmitted queue tail 3B. At this time, when the transmission window 45 is full by transmission of the data packet, the RR packet reception timer 46 is started and the channel state 44 is updated to the RR waiting state (steps F322-F326).

Referring now to FIG. 10, a process F4 upon termination of transmission of the data packet is described. This process is started when an affirmative frame of the HDLC level from the packet switching office is received in response to transmission of the data packet.

(1) The broadcasting table 3 corresponding to the transmission buffer in which transmission has been terminated is taken out and whether a transmission waiting queue is present or not is judged by reference to the transmission waiting queue head 38 (steps F401, F402).

(2) When it is judged in step F402 that a transmission waiting queue is present, the channel control table 4 chained to the transmission waiting queue are scanned. Thus, one channel control table 4 having the channel state 4 being in the transmittable state is selected from its head and the data packet in the transmission buffer returned upon termination of the transmission is sent (steps F403-F406).

(3) The transmission window 45 of the channel control table 4 with the data packet transmitted is updated and is disconnected from the transmission waiting queue to be connected to the transmitted queue chained to the transmitted queue head 3A and the transmitted queue tail 3B. At this time, when the transmission window 45 is full by transmission of the data packet, the RR packet reception timer 46 is started and the channel state 44 is updated to the RR waiting state (steps F407-F411).

(4) When it is judged in step F402 that no transmission waiting queue is present, the transmission termination buffer is connected to the chain of the transmission buffer queue head 36 and the transmission buffer queue tail 37 of the broadcasting table 3 and it is judged whether seven transmission buffers after connection are present or not. In step F402, when the transmission waiting queue is not present and there are seven transmission buffers, it can be judged that the broadcasting is completed (steps F412, F413).

(5) In step F413, when it is judged that the broadcasting is completed, all of channel control tables 4 chained to the transmitted queue head 3A and the transmitted queue tail 3B of the broadcasting table 3 are changed to the chain of the transmission waiting queue head 38 and the transmission waiting queue tail 39 and the received data packet saved in the broadcasting packet address 35 is discarded (steps F414, F415).

(6) Whether a broadcasting waiting queue is present or not is judged by reference to the broadcasting waiting queue head 33. When a broadcasting waiting queue is present, the received data packet is taken out and the broadcasting initiation process is performed. The broadcasting initiation process is quite identical with the process of steps F316 to F326 described in the reception process F3 of the data packet (steps F416-F418).

Referring now FIG. 11, a process F5 upon reception of the RR packet is described.

(1) When the broadcasting apparatus receives the RR packet, the channel control table 4 of the logic channel number 41 corresponding to the logic channel number in the RR packet is taken out (step F501).

(2) When the sink indication is detected by reference to the source/sink identification indication 43 of the channel control table 4, the transmission window is updated. If the updated transmission window 45 is not full, the RR packet reception timer 46 is stopped and the channel state 44 is updated to the transmittable state. Then, the transmission process of data packet to be described is made (steps F502-F506).

(3) As condition judgment of transmission of the data packet, reference is made to the broadcasting table address 42 of the channel control table 4 and the corresponding broadcasting table 3 is taken out. Whether the channel control table 4 itself is contained in the chain of the transmission waiting queue head 38 and the transmission waiting queue tail 39 or not is judged (steps F507, F508).

(4) In the judgment of step 508, when the channel control table is contained in the transmission waiting queue, whether transmission buffers are present or not is judged by reference to the transmission buffer queue 36 of the broadcasting table 3. When a transmission buffer is present, the data packet transmission process described later is carried out (step F509).

(5) In step F509, when it is judged that a transmission buffer is present, one transmission buffer is taken out from the transmission buffer queue head 36 and the data packet in the transmission buffer is sent (step F510).

(6) The transmission window 45 of the channel control table 4 is updated and is disconnected from the transmission waiting queue to be connected to the transmitted queue chained to the transmitted queue head 3A and the transmitted queue tail 3B. At this time, when the transmission window 45 is full by transmission of the data packet, the RR packet reception timer 46 is started and the channel state 44 is updated to the RR waiting state (steps F511-F515).

Referring now to FIG. 12, a process F6 of the RR packet transmission timer is described.

(1) The channel control table 4 having the RR packet transmission timer being started is taken out by reference to the RR packet transmission timer 47 (step F601).

(2) The RR packet transmission timer 47 corresponding to the timed-out logic channel is stopped and the RR packet is sent (steps F602-F604).

Referring now to FIG. 13, a process F7 of the RR packet reception timer is described.

(1) The channel control table 4 having the RR packet reception timer being started is taken out by reference to the RR packet reception timer 46 (step F701).

(2) The RR packet reception timer 46 corresponding to the timed-out logic channel is stopped and the channel state 44 is updated to the reset state. The transmission window 45 is reset and the reset packet is sent (steps F702-F706).

Referring now to FIG. 14, a process F8 upon reception of the reset packet is described.

(1) When the broadcasting apparatus receives the reset packet, the channel control table 4 of the logic channel number 41 corresponding to the logic channel number in the reset packet is taken out and the channel state 44 is updated to the transmittable state to send the reset response packet (steps F801-F803).

(2) When the source indication is detected by reference to the source/sink identification indication 43 of the channel control table 4, the RR packet transmission timer 47 is stopped (steps F804, F805).

(3) When the judgment of step F804 is the sink indication, the transmission window 45 is reset and the transmission process of the data packet is made. The transmission process of the data packet is quite identical with the process of steps F507-F515 described in the reception process F5 of the RR packet (steps F806, F807, F808).

Referring now to FIG. 15, a process F9 upon reception of the reset response packet is described.

(1) When the broadcasting apparatus receives the reset response packet, the channel control table 4 of the logic channel number 41 corresponding to the logic channel number in the reset response packet is taken out and the channel state 44 is updated to the transmittable state (steps F901, F902).

(2) When the sink indication is detected by reference to the source/sink identification indication 43 of the channel control table 4, the transmission process of the data packet is carried out. The transmission process of the data packet is quite identical with the process of steps F507-F515 described in the reception process F5 of the RR packet (steps F903, F904).

According to the embodiment of the present invention described above, since the call request source terminal can be registered as the broadcast destination terminal automatically, the broadcasting system with high flexibility and expandability can be attained for the packet switching system. Further, by providing the broadcasting apparatuses dispersedly in the packet switching system if necessary, the broadcasting can be made in a short time for a number of broadcast destination terminals without increased trunk traffic of the packet switching network.

As described above, according to the present invention, the broadcasting system with high flexibility and expandability can be structured in the packet switching system and the broadcasting can be made in a short time for a number of broadcast destination terminals without increased trunk traffic of the packet switching network.

We claim:

1. A packet broadcasting method for broadcasting a data packet received by a broadcasting source terminal to a plurality of broadcast destination terminals connected to at least one arbitrary packet switching office in a packet switching network, comprising the steps of:

providing at least one broadcasting apparatus having at least one unique terminal address in the packet switching network;

defining for each terminal address a broadcasting table in which a broadcasting source terminal is registered for each terminal address in said broadcasting apparatus:

registering a broadcast destination terminal in said broadcasting table corresponding to said unique terminal address, in response to a call set-up to said unique terminal address from a first terminal, said first terminal corresponding to said broadcast destination terminal; and sending, by means of said broadcasting apparatus, in response to reception of a data packet from said broadcasting source terminal after the call set-up from said broadcasting source terminal to said peculiar terminal address, a data packet having the same data as that of the received data packet to said broadcast destination terminal.

2. A packet broadcasting method according to claim 1, wherein said broadcasting apparatus includes a plurality of peculiar terminal addresses.

3. A packet broadcasting method according to claim 1, wherein said sending step of the data packet to said broadcast destination terminals includes a step of copying contents of the data packet received from said broadcasting source terminal to smaller number of transmission buffers than the number of said broadcast destination terminals and sending the data packet by repeatedly using said transmission buffers.

4. A packet broadcasting method according to claim 1, wherein said providing step includes a step of disposing a plurality of broadcasting apparatuses in the packet switching network and said defining step of said broadcasting table includes a step of defining a broadcasting table in which at least one higher-rank broadcasting apparatus is registered as a broadcasting source terminal of a lower-rank broadcasting apparatus, said lower-rank broadcasting apparatus including a step of effecting a call set-up to said higher-rank broadcasting apparatus.

5. A packet broadcasting method according to claim 2, wherein said sending step of the data packet to said broadcast destination terminal includes a step of copying contents of the data packet received from said broadcasting source terminal to smaller number of transmission buffers than the number of said broadcast destination terminals and sending the data packet by repeatedly using said transmission buffers.

6. A packet broadcasting method according to claim 2, wherein said providing step includes a step of disposing a plurality of broadcasting apparatuses in the packet switching network and said defining step of said broadcasting table includes a step of defining a broadcasting table in which at least one higher-rank broadcasting apparatus is registered as a broadcasting source terminal of a lower-rank broadcasting apparatus, said lower-rank broadcasting apparatus including a step of effecting a call set-up to said higher-rank broadcasting apparatus.

7. A packet broadcasting method according to claim 5, wherein said providing step includes a step of disposing a plurality of broadcasting apparatuses in the packet switching network and said defining step of said broadcasting table includes a step of defining a broadcasting table in which at least one higher-rank broadcasting apparatus is registered as a broadcasting source terminal of a lower-rank broadcasting apparatus, said lower-rank broadcasting apparatus including a step of effecting a call set-up to said higher-rank broadcasting apparatus.

8. A packet broadcasting method according to claim 3, wherein said providing step includes a step of disposing a plurality of broadcasting apparatuses in the packet switching network and said defining step of said broadcasting table includes a step of defining a broadcasting table in which at least one higher-rank broadcasting apparatus is registered as a broadcasting source terminal of a lower-rank broadcasting apparatus, said lower-rank broadcasting apparatus including a step of effecting a call set-up to said higher-rank broadcasting apparatus.

9. A packet broadcasting method according to claim 4, wherein said plurality of broadcasting apparatuses are disposed at arbitrary locations in the packet switching network and communications are conducted between arbitrary broadcasting apparatuses.

10. A method of defining a broadcasting network for broadcasting a data packet, comprising the steps of:
providing a master broadcasting apparatus;
linking a source terminal to said master broadcasting apparatus;
providing a slave broadcasting apparatus;
linking said slave broadcasting apparatus to said master broadcast terminal;
defining a broadcasting table in said slave broadcasting apparatus, said broadcasting table storing addresses for a plurality of terminals for receiving a data packet provided by said source terminal; and
registering a terminal address in said broadcasting table in response to a set up call from one of said plurality of terminals.

11. The method of claim 10 wherein said step of linking said source terminal to said master broadcasting apparatus comprises the step of coupling both said source terminal and said master broadcasting apparatus to a first packet switching office.

12. The method of claim 11, wherein said step of linking said slave broadcasting apparatus to said master broadcasting apparatus comprises the steps of coupling said slave broadcasting apparatus to a second packet switching office and coupling said second packet switching office to said first packet switching office.

13. The method of claim 12, wherein said set up call from one of said plurality of terminals is provided to said slave broadcasting device via said second switching packet office.

14. A packet data broadcasting network comprising:
a packet data source terminal;
a plurality of receiving terminals adapted to receive packet data;
a master broadcast apparatus;
a first packet switching office linking said packet data source terminal and said master broadcast apparatus;
a slave broadcast apparatus;
a second packet switching office linking said plurality of receiving terminals to said slave broadcast apparatus;
wherein said first packet switching office is linked to said second packet switching office; and
wherein said slave broadcast apparatus includes a slave broadcasting table and means for registering an address of one of said plurality of receiving terminals in said slave broadcasting table in response to a set up call from said one of said plurality of receiving terminals to said slave broadcast apparatus via said second packet switching office.

15. The system of claim 14, wherein said slave broadcast terminal further comprises a means for generating an address registration request to said master broadcast apparatus in response to the set-up call;
wherein said master broadcast apparatus includes a master broadcast table and means for registering an address of a slave broadcast apparatus in said master broadcast table upon receipt of said address registration request.

16. The system of claim 14 further comprising:
a second plurality of receiving terminals adapted to receive packet data;
a second slave broadcast apparatus;
a third packet switching office linking said second slave broadcast apparatus and said second plurality of receiving terminals.

17. The system of claim 14 further comprising:
a second plurality of receiving terminals adapted to receive packet data;
a second slave broadcast apparatus;
a third packet switching office linking said second slave broadcast apparatus and said second plurality of receiving terminals.

* * * * *